(12) United States Patent
Li et al.

(10) Patent No.: US 8,724,443 B2
(45) Date of Patent: *May 13, 2014

(54) METHODS AND APPARATUS FOR SUBFRAME CONFIGURATION AND GENERATION IN A MULTI-CARRIER COMMUNICATION SYSTEM

(75) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 381 days.

This patent is subject to a terminal disclaimer.

(21) Appl. No.: 13/226,434

(22) Filed: Sep. 6, 2011

(65) Prior Publication Data

US 2011/0317608 A1    Dec. 29, 2011

Related U.S. Application Data

(63) Continuation of application No. 11/568,385, filed as application No. PCT/US2005/014835 on Apr. 29, 2005, now Pat. No. 8,014,264.

(60) Provisional application No. 60/567,234, filed on May 1, 2004.

(51) Int. Cl.
*H04J 11/00*    (2006.01)

(52) U.S. Cl.
USPC ............................ 370/203; 370/280; 370/330

(58) Field of Classification Search
USPC ........................................ 370/230.1; 709/224
See application file for complete search history.

(56) References Cited

U.S. PATENT DOCUMENTS

| | | | |
|---|---|---|---|
| 4,977,593 | A | 12/1990 | Ballance et al. |
| 5,594,720 | A | 1/1997 | Papadopoulos et al. |
| 5,867,478 | A | 2/1999 | Baum et al. |
| 5,991,308 | A | 11/1999 | Fuhrmann et al. |
| 6,016,311 | A | 1/2000 | Gilbert et al. |
| 6,334,057 | B1 | 12/2001 | Malmgren et al. |
| 6,377,783 | B1 | 4/2002 | Lo et al. |
| 6,400,783 | B1 | 6/2002 | Cusani |
| 6,442,222 | B1 | 8/2002 | Ghazi-Moghadam et al. |

(Continued)

FOREIGN PATENT DOCUMENTS

| | | |
|---|---|---|
| CN | 1407816 A | 4/2003 |
| CN | 1428946 A | 7/2003 |

(Continued)

OTHER PUBLICATIONS

3GPP, "3GPP TR 25.950 v4.0.0 (Mar. 2001) Technical Report," 27 pages, 2001.

(Continued)

*Primary Examiner* — Mark Rinehart
*Assistant Examiner* — Matthew Hopkins
(74) *Attorney, Agent, or Firm* — Perkins Coie LLP

(57) ABSTRACT

Methods and apparatus for subframe configuration and generation in a multi-cell multi-carrier system. A frame for radio transmission in the system consists of multiple subframes, and each subframe consists of multiple Orthogonal Frequency Division Multiplexing (OFDM) symbols. Training symbols, frequency-domain data scrambling, size of Fast-Fourier Transform (FFT), or length of cyclic prefix can be configured differently for each subframe to facilitate different applications, such as unicasting or broadcasting.

28 Claims, 7 Drawing Sheets

(56) References Cited

U.S. PATENT DOCUMENTS

| | | |
|---|---|---|
| 6,459,740 B1 | 10/2002 | Lo |
| 6,480,558 B1 | 11/2002 | Ottosson et al. |
| 6,490,270 B1 | 12/2002 | Krishnamoorthy et al. |
| 6,515,960 B1 | 2/2003 | Usui et al. |
| 6,519,449 B1 | 2/2003 | Zhang et al. |
| 6,519,731 B1 | 2/2003 | Huang et al. |
| 6,567,383 B1 | 5/2003 | Bohnke |
| 6,577,617 B1 | 6/2003 | Ue et al. |
| 6,577,641 B1 | 6/2003 | Izumi et al. |
| 6,577,650 B1 | 6/2003 | Tate et al. |
| 6,643,281 B1 | 11/2003 | Ryan |
| 6,731,673 B1 | 5/2004 | Kotov et al. |
| 6,741,578 B1 | 5/2004 | Moon et al. |
| 6,912,405 B2 | 6/2005 | Hiramatsu et al. |
| 6,922,388 B1 | 7/2005 | Laroia et al. |
| 6,940,827 B2 | 9/2005 | Li et al. |
| 6,940,914 B1 | 9/2005 | Lo et al. |
| 6,947,748 B2 | 9/2005 | Li et al. |
| 7,020,072 B1 | 3/2006 | Li et al. |
| 7,039,001 B2 | 5/2006 | Krishnan et al. |
| 7,062,002 B1 | 6/2006 | Michel et al. |
| 7,164,669 B2 | 1/2007 | Li et al. |
| 7,181,246 B2 | 2/2007 | Lo |
| 7,200,124 B2 | 4/2007 | Kim et al. |
| 7,257,423 B2 | 8/2007 | Iochi |
| 7,388,847 B2 | 6/2008 | Dubuc et al. |
| 7,437,166 B2 | 10/2008 | Osseiran et al. |
| 7,443,829 B2 | 10/2008 | Rizvi et al. |
| 7,447,968 B2 | 11/2008 | Ha et al. |
| 7,567,624 B1 | 7/2009 | Schmidl et al. |
| 7,738,437 B2 | 6/2010 | Ma et al. |
| 7,907,592 B2 | 3/2011 | Han et al. |
| 8,009,660 B2 | 8/2011 | Li et al. |
| 8,014,264 B2 | 9/2011 | Li et al. |
| 2001/0056560 A1 | 12/2001 | Khan et al. |
| 2002/0067709 A1 | 6/2002 | Yamada et al. |
| 2002/0105918 A1 | 8/2002 | Yamada et al. |
| 2002/0122393 A1 | 9/2002 | Caldwell et al. |
| 2002/0159422 A1 | 10/2002 | Li et al. |
| 2002/0159430 A1 | 10/2002 | Atarashi et al. |
| 2003/0063588 A1 | 4/2003 | Lee et al. |
| 2003/0072285 A1 | 4/2003 | Onggosanusi et al. |
| 2003/0081538 A1 | 5/2003 | Walton et al. |
| 2003/0103445 A1 | 6/2003 | Steer et al. |
| 2003/0147358 A1* | 8/2003 | Hiramatsu et al. ............ 370/281 |
| 2003/0189917 A1 | 10/2003 | Sudo |
| 2003/0214927 A1 | 11/2003 | Atarashi et al. |
| 2004/0022176 A1 | 2/2004 | Hashimoto et al. |
| 2004/0085946 A1 | 5/2004 | Morita et al. |
| 2004/0128605 A1 | 7/2004 | Sibecas et al. |
| 2004/0142698 A1 | 7/2004 | Pietraski |
| 2005/0003782 A1 | 1/2005 | Wintzell |
| 2005/0201326 A1 | 9/2005 | Lakkis |
| 2005/0243774 A1 | 11/2005 | Choi et al. |
| 2006/0089102 A1 | 4/2006 | Nishio et al. |
| 2006/0245409 A1 | 11/2006 | Korpela et al. |
| 2007/0026803 A1 | 2/2007 | Malm |
| 2007/0263735 A1* | 11/2007 | Tong et al. .................... 375/260 |
| 2007/0274278 A1 | 11/2007 | Choi et al. |

FOREIGN PATENT DOCUMENTS

| | | |
|---|---|---|
| CN | 1571531 A | 1/2005 |
| WO | WO-03034646 A2 | 4/2003 |
| WO | WO-2005002086 A1 | 1/2005 |

OTHER PUBLICATIONS

3GPP, 3GPP TS 25.308 v6.0.0 (Dec. 2003) Technical Specification, 28 pages, 2004.

ETSI EN 300 744 V1.5.1 (Jun. 2004) Digital Video Broadcasting (DVB); Framing structure, channel coding and modulation for digital terrestrial television. European Broadcasting Union 2004.

IEEE Computer Society, "IEEE Std 802.16-2004, IEEE Standard for Local and Metropolitan Area Networks, Part 16: Air Interface for Fixed Broadband Wireless Access Systems," 895 pages, Oct. 1, 2004.

International Search Report and Written Opinion; International Application No. PCT/US05/01939; Applicant: Waltical Solutions, Inc.; Date of Mailing: Apr. 26, 2005; Filed Jan. 20, 2005, 7 pages.

International Search Report and Written Opinion; PCT Application No. PCT/US05/01939; Filed Jan. 20, 2005; Applicant: Waltical Solutions, Inc.; Mailed Apr. 26, 2005; 7 pages.

International Search Report and Written Opinion; PCT Application No. PCT/US05/03889; Filed Feb. 7, 2005; Applicant: Waltical Solutions, Inc.; Mailed Jun. 10, 2005; 8 pages.

International Search Report and Written Opinion; PCT Application No. PCT/US05/04601; Filed Feb. 14, 2005; Applicant: Waltical Solutions, Inc.; Mailed Jun. 7, 2005; 9 pages.

International Search Report dated Sep. 27, 2005 under PCT Application PCT/US05/14835, 3 pages.

Transmittal of International Search Report; PCT Application No. PCT/US05/08169; Filed Mar. 9, 2005; Applicant: Waltical Solutions, Inc.; Mailed Jun. 9, 2005; 9 pages.

* cited by examiner

METHODS AND APPARATUS FOR SUBFRAME CONFIGURATION AND GENERATION IN A MULTI-CARRIER COMMUNICATION SYSTEM

CROSS-REFERENCE TO RELATED APPLICATION(S)

This application is a continuation of and incorporates by reference in its entirety U.S. patent application Ser. No. 11/568,385, having a 371 date of Aug. 16, 2007 now U.S. Pat. No. 8,014,264, which is a U.S. National Stage of International Application No. PCT/US2005/014835, filed Apr. 29, 2005, which claims the benefit of U.S. Provisional Patent Application No. 60/567,234, filed on May 1, 2004. This application also relates to PCT Application No. PCT/US2005/001939 filed Jan. 20, 2005, which claims the benefit of U.S. Provisional Application No. 60/540,032 filed Jan. 29, 2004; PCT Application No. PCT/US2005/004601 filed Feb. 14, 2005, which claims the benefit of U.S. Provisional Application No. 60/544,521 filed Feb. 13, 2004; PCT Application No. PCT/US2005/003889 filed Feb. 7, 2005, which claims the benefit of U.S. Provisional Application No. 60/542,317 filed Feb. 7, 2004; and PCT Application No. PCT/US2005/008169 filed Mar. 9, 2005, which claims the benefit of U.S. Provisional Application No. 60/551,589 filed Mar. 9, 2004.

BACKGROUND

It is foreseeable that in future wireless communications will include voice, interactive data, video and audio on-demand, and digital video and audio broadcasting services. It will be efficient and cost-effective for a single system to provide these services simultaneously. The challenges in developing such a system lie in two aspects of the distinctive transmission characteristics associated with these applications: traffic symmetry and signal interaction environment. For example, voice traffic is symmetric on both the downlink and uplink, whereas interactive-data traffic is asymmetric, with heavier load on the downlink. Voice services are based on unicast, where signals from other base stations are considered as unwanted interference and thus should be minimized, and whereas data broadcast services In general, existing wireless systems are inadequate in dealing with both aspects of these challenges. Some time-division duplex systems are designed to support asymmetric two-way applications, but are unequipped to carry out broadcasting efficiently. Some systems are designed for broadcast, but are unable to provide two-way applications. There is a need to overcome such underlying difficulties.

BRIEF DESCRIPTION OF THE DRAWINGS

FIG. 4 illustrates interleaved subchannels.

DETAILED DESCRIPTION

The multi-carrier system mentioned here can be of any format such as OFDM, or Multi-Carrier Code Division Multiple Access (MC-CDMA). The disclosed methods can also be applied to downlink, uplink, or both, where the duplexing technique is either Time Division Duplexing (TDD) or Frequency Division Duplexing (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
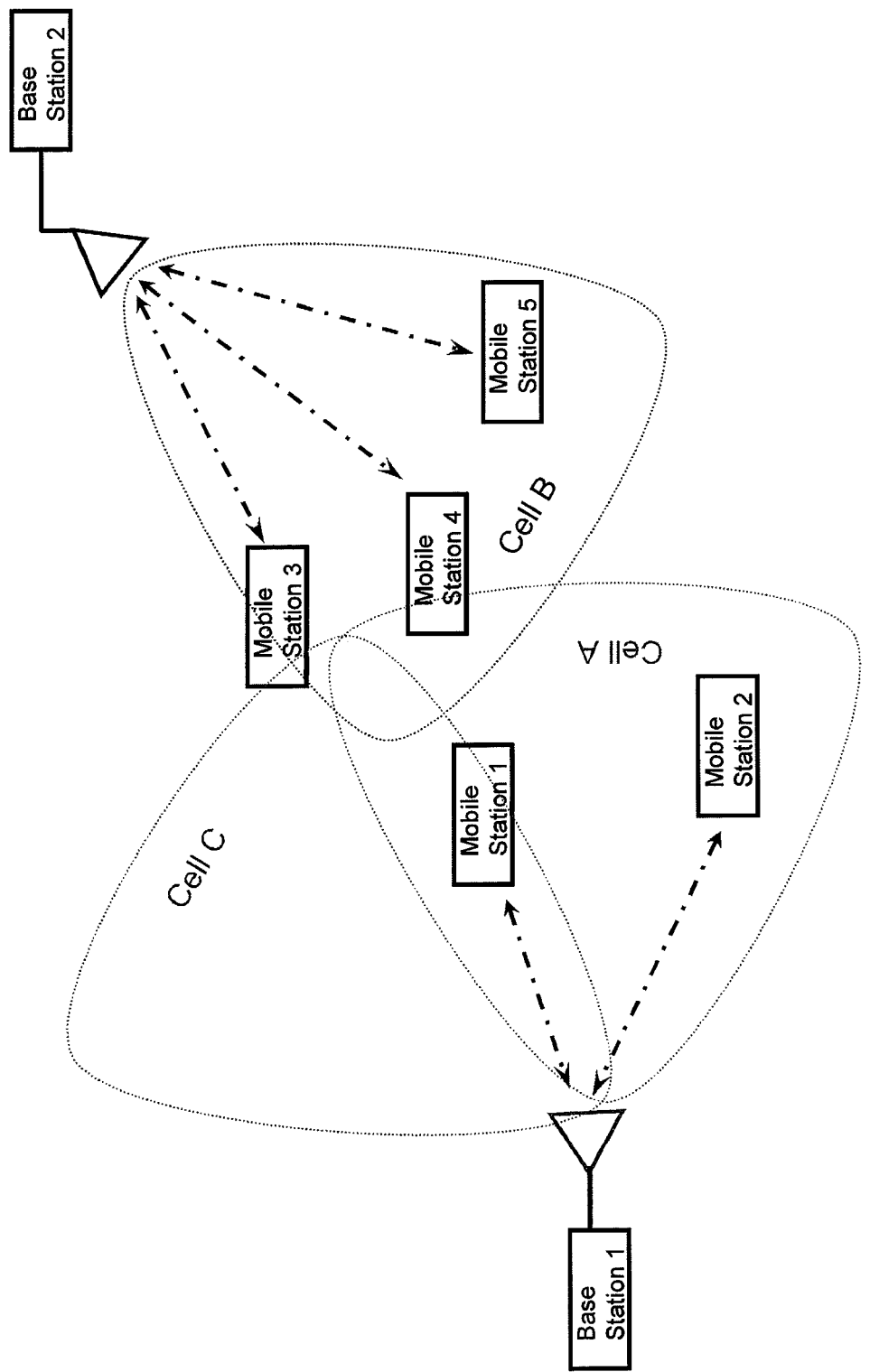
FIG. 1 illustrates a multi-cell, multi-user cellular system.

In a cellular system with base stations and mobile stations, the transmission from a base station to a mobile station is called a downlink and the transmission from a mobile station to a base station is called an uplink. The coverage area of a base station is called a cell, which may be further divided into multiple sectors. In this description no distinction is made between a cell and a sector. Both are generally called a cell. FIG. 1 is an illustration of a multi-cell, multi-user cellular system.

In accordance with the principles of the invention, a transmission frame consists of multiple subframes, each containing a downlink transmission period and an uplink transmission period. The same structure of the transmission frame is used by all the cells within the network, and frames are transmitted in synchronization among the cells. That is, a transmission frame begins at substantially the same time in each cell. Proper guard periods (GP1 and GP2) are inserted to account for the time needed to turn on and off transmitters and receivers, as well as radio propagation delay.

The ratio of downlink and uplink transmission periods in each subframe can be independently adapted to support applications with a variety of traffic patterns, from symmetric to highly asymmetric, during initial deployment or system run time. This way, a great variety of applications from normal two-way data communication, to voice communication, video or data broadcasting, can be supported efficiently in a single frequency band, while multiple frequency bands can be used to increase capacity or add more flexibility.

Figure 2:
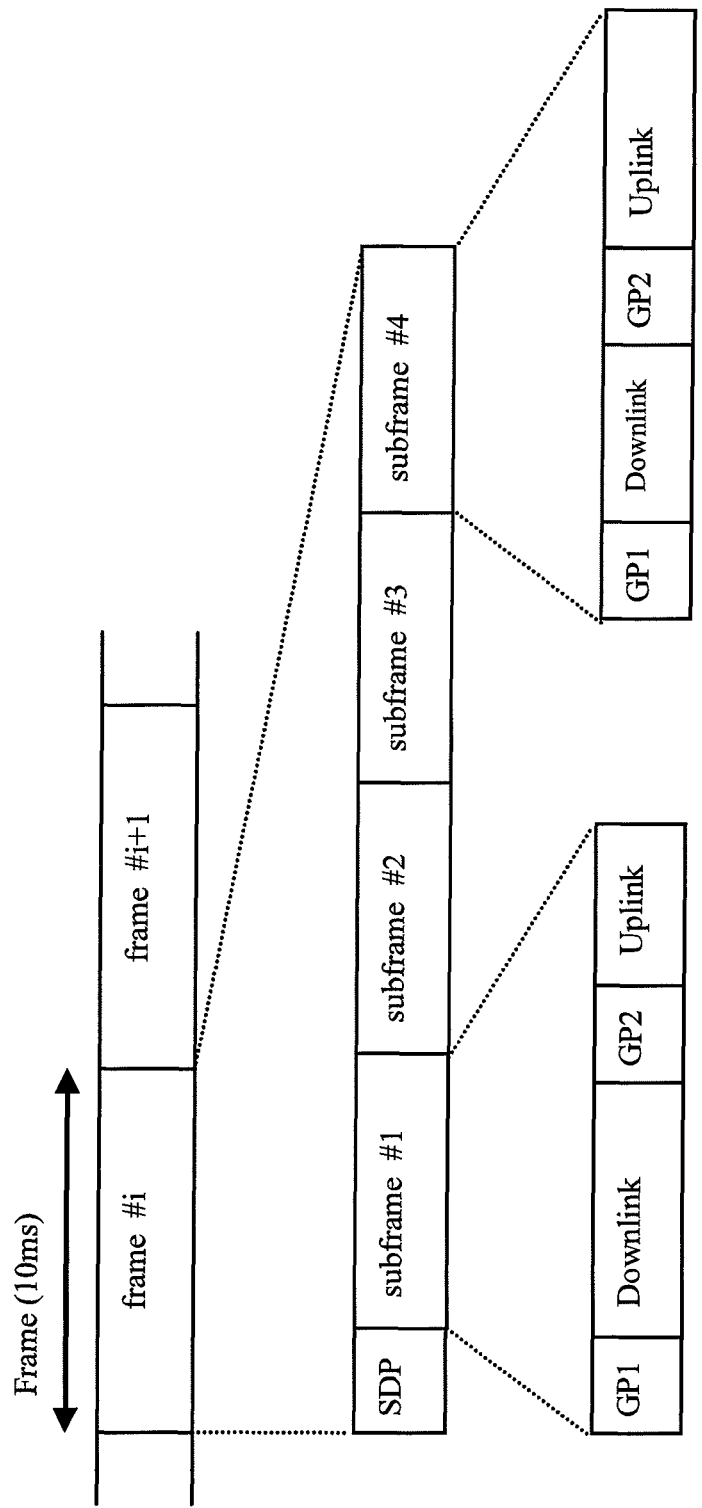
FIG. 2 illustrates frame structure of an exemplary TDD system, where a frame is divided into four subframes and each subframe can have a different ratio of downlink and uplink periods.

In the example shown in FIG. 2, a 10-ms frame is divided into four subframes. The downlink and uplink ratio can be different for different subframes. For example, the downlink is longer than the uplink in subframe #1, while the downlink is shorter than the uplink in subframe #4.

Figure 3:
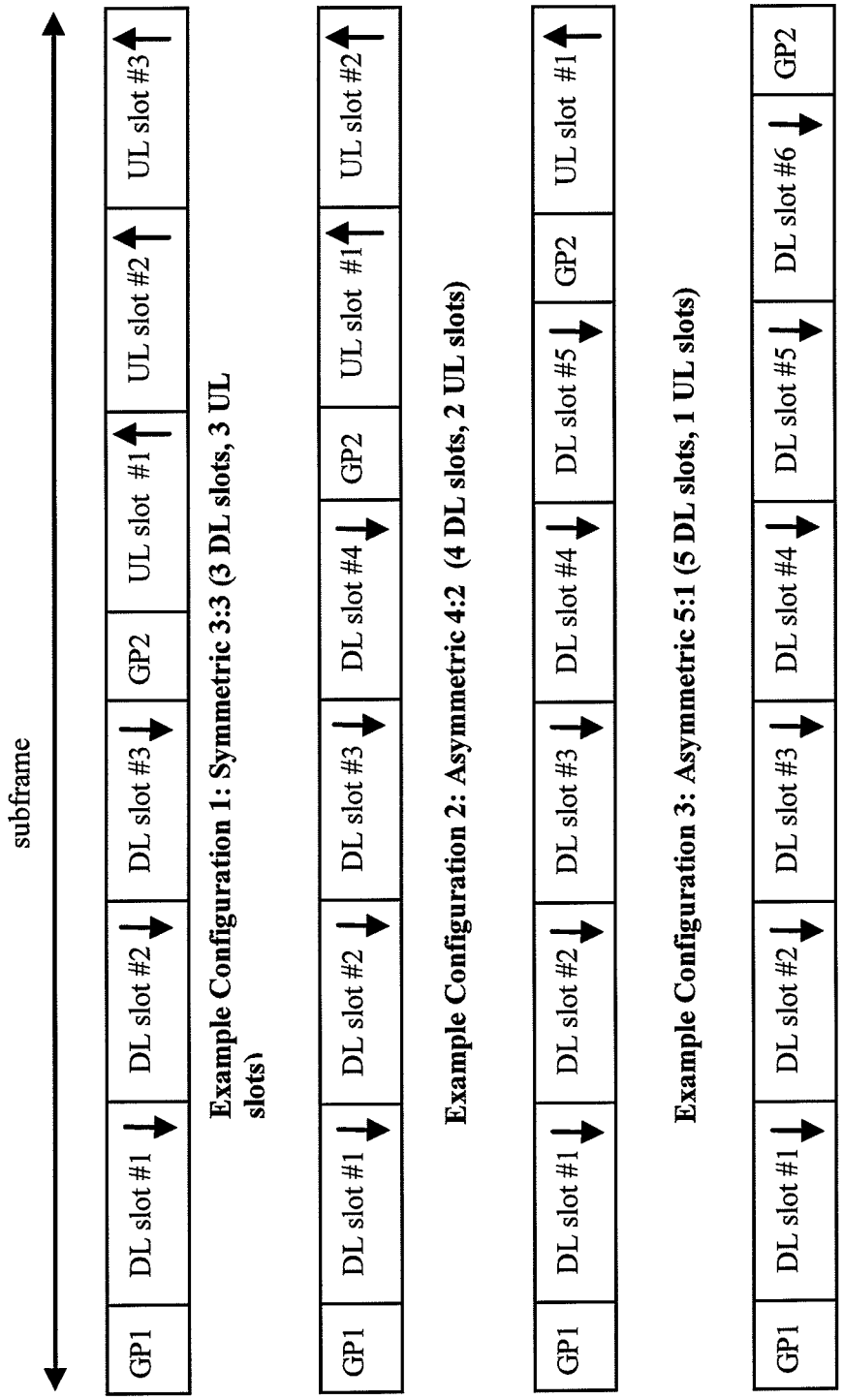
FIG. 3 illustrates four examples of the subframe structure depicted in the exemplary system of FIG. 2.

In one embodiment, each subframe is further divided into multiple slots. The time-slot configuration within each individual subframe can be adjusted to a different ratio of the number of downlink slots to that of the uplink slots. In the example shown in FIG. 3, each subframe consists of six time-slots. To support different applications ranging from symmetric services to highly asymmetric services, the six time-slots within each individual subframe of this example can be configured to seven different downlink and uplink ratios (3:3, 4:2, 5:1, 6:0, 2:4, 1:5, and 0:6). The first four configurations are illustrated in FIG. 3.

In an embodiment that provides multiple services, a transmission frame is comprised of subframes with different downlink and uplink ratios. For example, amongst the four subframes, a 6:0-ratio subframe is used to support digital video broadcasting services; a 3:3-ratio subframe is used to support symmetric voice over IP (VoIP) services; and two 4:2-ratio subframes are used to support typical asymmetric data services.

The described frame structure allows for lower overhead while maintaining short subframes. This makes fast feedback possible between mobile stations and their base stations and enables an adaptable frame structure (AFS) system to make more effective use of other advanced technologies such as link adaptation, hybrid ARQ, beamforming, and transmit diversity.

In one embodiment, the subframe is limited to a relatively small duration with respect to the channel coherence time, thereby effectively making use of other radio technologies that require a fast feedback channel. In correspondence with the above example, the subframe duration is designed to be around 2.4 ms, which is much less than 7.66 ms, the coherence time for a 60-km/h mobile channel at 2.35 GHz.

In one embodiment, each frame contains a special downlink period (SDP), during which a base station broadcasts signals for control information, such as the ratio of downlink and uplink in each subframe in that frame, cell identity information, and other system and adaptive control information. The SDP can be placed either outside of individual subframes, preferably at the beginning of a frame, as shown in FIG. 2, or within the downlink of subframes. Multiple SDPs can also be inserted into a frame. Also, multiple subframes can share the use of the same SDP to reduce the overhead and to increase the overall system spectral efficiency.

In another embodiment, each frame contains at least one special uplink period (SUP), during which mobile stations may carry out functions such as initial ranging during power up and handoff, periodic ranging, and bandwidth request, channel sounding to assist downlink scheduling or advanced antenna technologies, and other radio functions. The SUP can be placed outside of individual subframes. Alternatively, the SUP can be placed within the uplink period of individual subframes, preferably, in the beginning of the uplink period. Multiple SUPs can be inserted into a frame. Also, multiple subframes can share the same SUP to reduce the overhead and to increase the overall system spectral efficiency.

In yet another embodiment, the SUP is either based on contention or coordination. In the latter case, the use of the SUP is fully or partially scheduled by the base station and the scheduling information is carried by the downlink signal.

In accordance with the embodiments of this invention, adaptive transmission techniques such as adaptive modulation and coding (AMC) and power control may be applied to downlink transmission, uplink transmission, or both.

In one embodiment, a mobile station monitors the downlink signal quality and sends the channel quality information (CQI) to its serving base station. The base station adjusts modulation and coding schemes (MCS) based on the received CQI for the downlink transmission to this mobile station and sends the indication of MCS to this mobile station.

In another embodiment, the downlink transmission uses power control. A mobile station monitors the downlink signal quality and sends the power control requests to its serving base station. The base station adjusts transmission power to this mobile station accordingly.

In yet another embodiment, AMC and power control are jointly performed. The feedback from a mobile station contains information for both AMC and power control. The base station adjusts MCS and power level for the transmission to this mobile accordingly, and sends indication signal to this mobile station about the adjustments.

In another embodiment, the uplink transmission uses AMC. The base station monitors uplink signals and sends the CQI to mobile stations. Mobile stations adjust the MCS based on the received CQI and also send the indication of MCS to the base station. Alternatively, the base station makes decisions on the MCS for each mobile station uplink transmission based on its received uplink signals. Then the base station sends the command to mobile stations to dictate the use of the decided MCS.

In yet another embodiment, the uplink transmission uses power control. The base station monitors the uplink signal quality and sends the power control requests to mobile stations. Mobile stations adjust transmission power accordingly.

In still another embodiment, AMC and power control are jointly performed. The feedback or the decision from the base station contains information for both AMC and power control. Mobile stations adjust MCS and power level accordingly.

In accordance with the aspects of this invention, hybrid ARQ is applied to the downlink transmission, uplink transmission, or both. In one embodiment, mobile stations detect the transmitted packet from the base station and send the acknowledgement (ACK) or negative acknowledgement (NAK) to the base station. If NAK is received at the base station, it either re-transmits the same packet or transmits more redundancy to facilitate the further decoding of the previously failed packet at the mobile station.

In another embodiment, a base station detects the transmitted packet from the mobile stations and sends the acknowledgement (ACK) or negative acknowledgement (NAK) to the mobile stations. If NAK is received at the mobile station, it either re-transmits the same packet or transmits more redundancy to facilitate the further decoding of the previously failed packet at the base station.

In accordance with the principles of this invention, different types of services can be provided via different subframes. For example, two-way data communication is carried out using a subframe, for example the first subframe, while data (including video) broadcasting is carried out using another subframe, for example the second subframe. Therefore, the first and second subframes can be configured, based on their own transmission characteristics, with different system parameters, such as a scrambler or randomizer, subchannel (in OFDM) or code (in CDMA) construction, size of FFT (Fast Fourier Transform) (in OFDM) or length of spreading codes (in CDMA), and training signal configuration.

In one embodiment, in the first subframe, the scrambler or randomizer, and the training symbol configuration are different in individual cells to achieve inter-cell interference randomization and to facilitate frequency reuse among multiple cells. In the second subframe, the scrambler or randomizer, and the training symbol configuration on the downlink are set to be the same for different cells; therefore, multiple base stations and cells form a single frequency network (SFN). This improves broadcasting performance because broadcast data is the same for all cells in the network.

In another embodiment, the entire said second subframe is used for downlink broadcasting or at least one uplink timeslot is used to facilitate a continuous flow of channel feedback information, potentially improving the communication efficiency in other subframes.

In yet another embodiment, a base station provides two-way data communication services using the first subframe and another base station provides broadcasting services using the second subframe. Cell size is not necessarily the same for these two base stations. For example, broadcasting base stations use higher transmission power to cover a larger area than do two-way data communication base stations.

In accordance with the embodiments in this invention, the AFS makes it feasible and practical to configure the system to achieve the equivalent effects of frequency reuse. For example, in the case in FIG. 3, amongst the four subframes within a frame, the odd-number subframes may be allocated for one group of cells; and the even-number subframes allocated for another group of base stations, thus creating an operating environment with a frequency reuse factor of 2. In this case, the flexible frequency reuse factor makes it possible to have one frequency band to support frequency reuse of one and two.

Furthermore, the use of this type of subframe structure makes it possible for run-time configuration to adapt to the change in service type without interrupting the service. For instance, one subframe can be turned off momentarily for all the cells and re-configured to a different DL/UL ratio when the traffic pattern changes, while normal communication is maintained in other subframes.

The physical media resource (e.g., radio or cable) in a multi-carrier communication system can be divided in both frequency and time domains. This canonical division provides a high flexibility and fine granularity for resource sharing. Within a particular spectral band or channel, there are a fixed number of subcarriers. The basic structure of a multi-carrier signal in the frequency domain is made up of subcarriers. There are three types of subcarriers:

1. Data subcarriers, which carry information data;
2. Pilot subcarriers, whose phases and amplitudes are predetermined and made known to all receivers and which are used for assisting system functions such as estimation of system parameters; and
3. Silent subcarriers, which have no energy and are used for guard bands and DC carrier.

Figure 4:
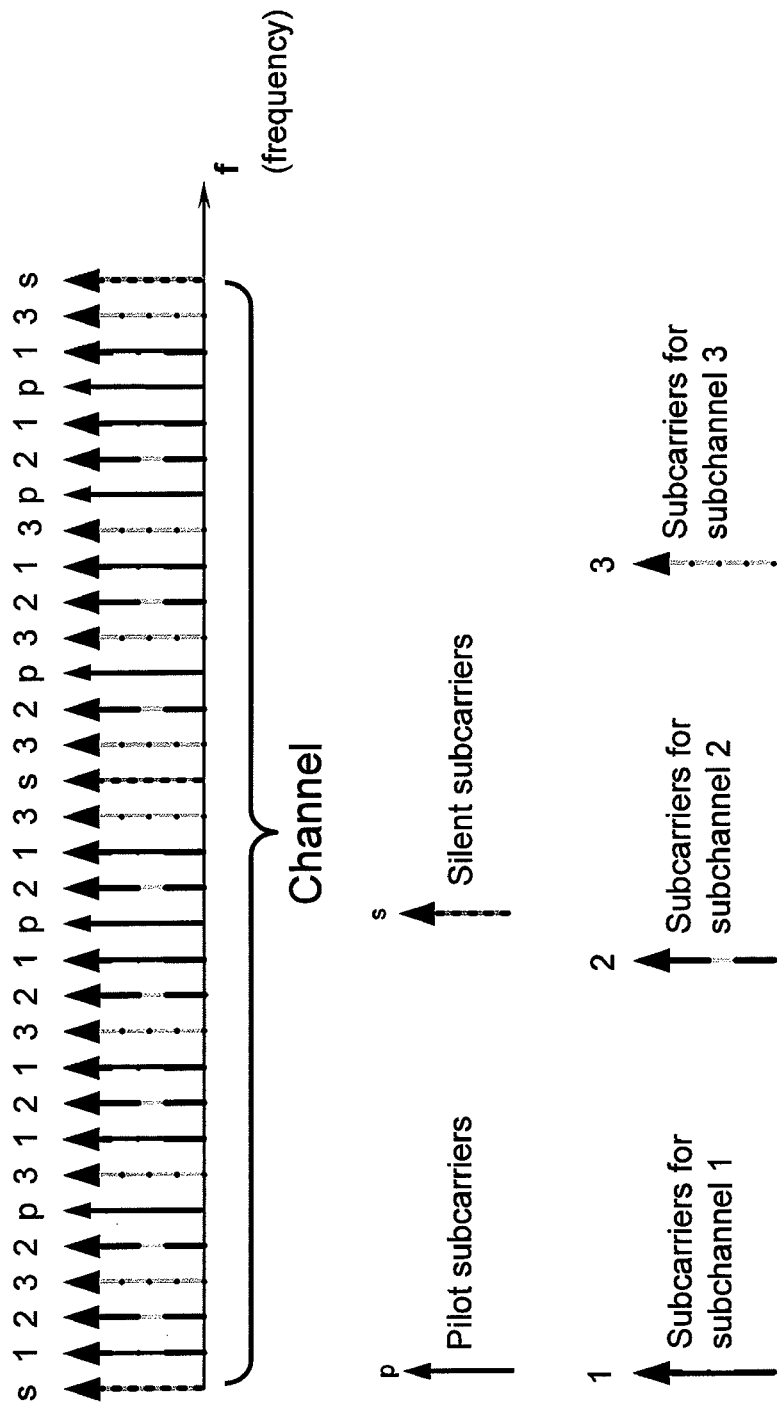
FIG. 4 illustrates a basic structure of a multi-carrier signal in the frequency domain, which is made up of subcarriers that can be grouped into subchannels. The pilot subcarriers are also distributed over the entire channel.
Figure 5:
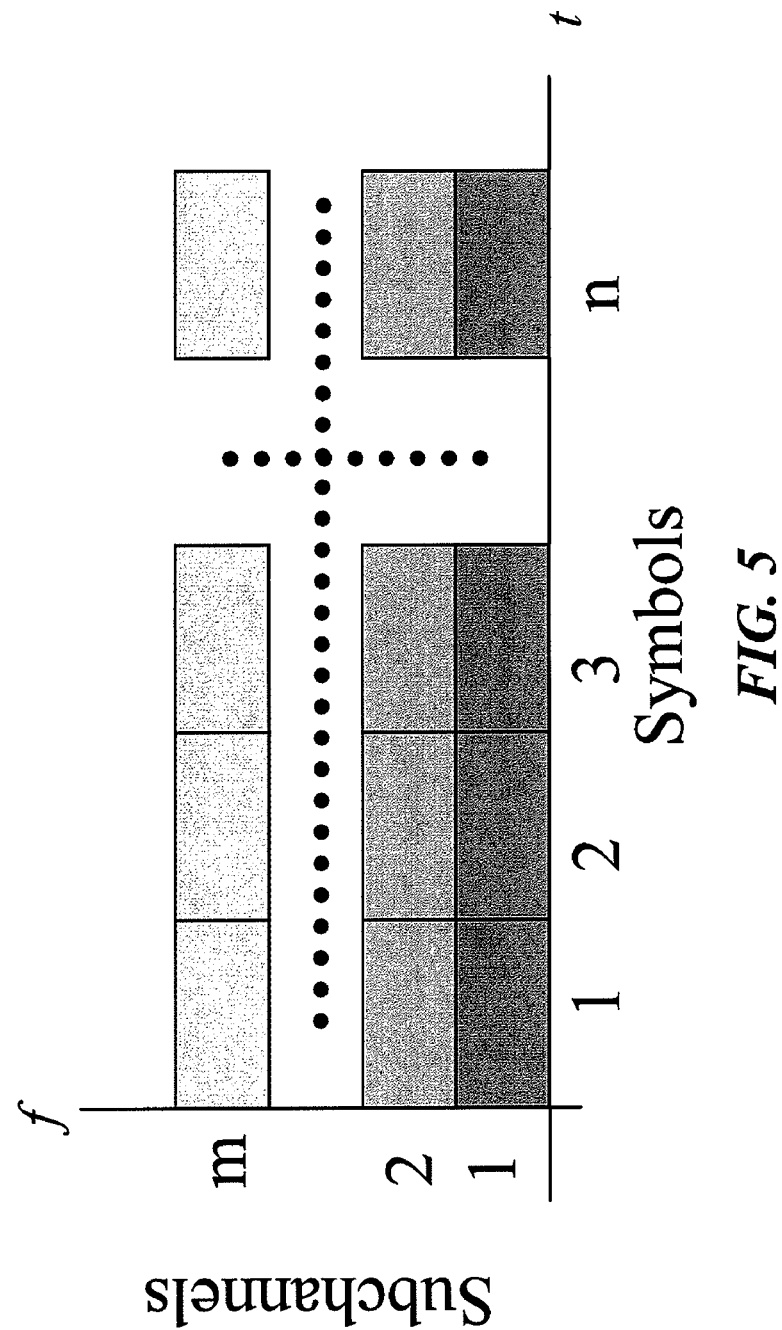
FIG. 5 illustrates a radio resource divided into small units in both the frequency and time domains—subchannels and time-slots. The basic structure of a multi-carrier signal in the time domain is made up of symbols.

The data subcarriers can be arranged into groups called subchannels to support scalability and multiple-access. The carriers forming one subchannel are not necessarily adjacent to each other. Each user may use part or all of the subchannels. The concept is illustrated in FIG. 4 for the interleaved subchannels at the base station transmitter. The resource division in both the frequency and time domains is depicted in FIG. 5.

Figure 6:
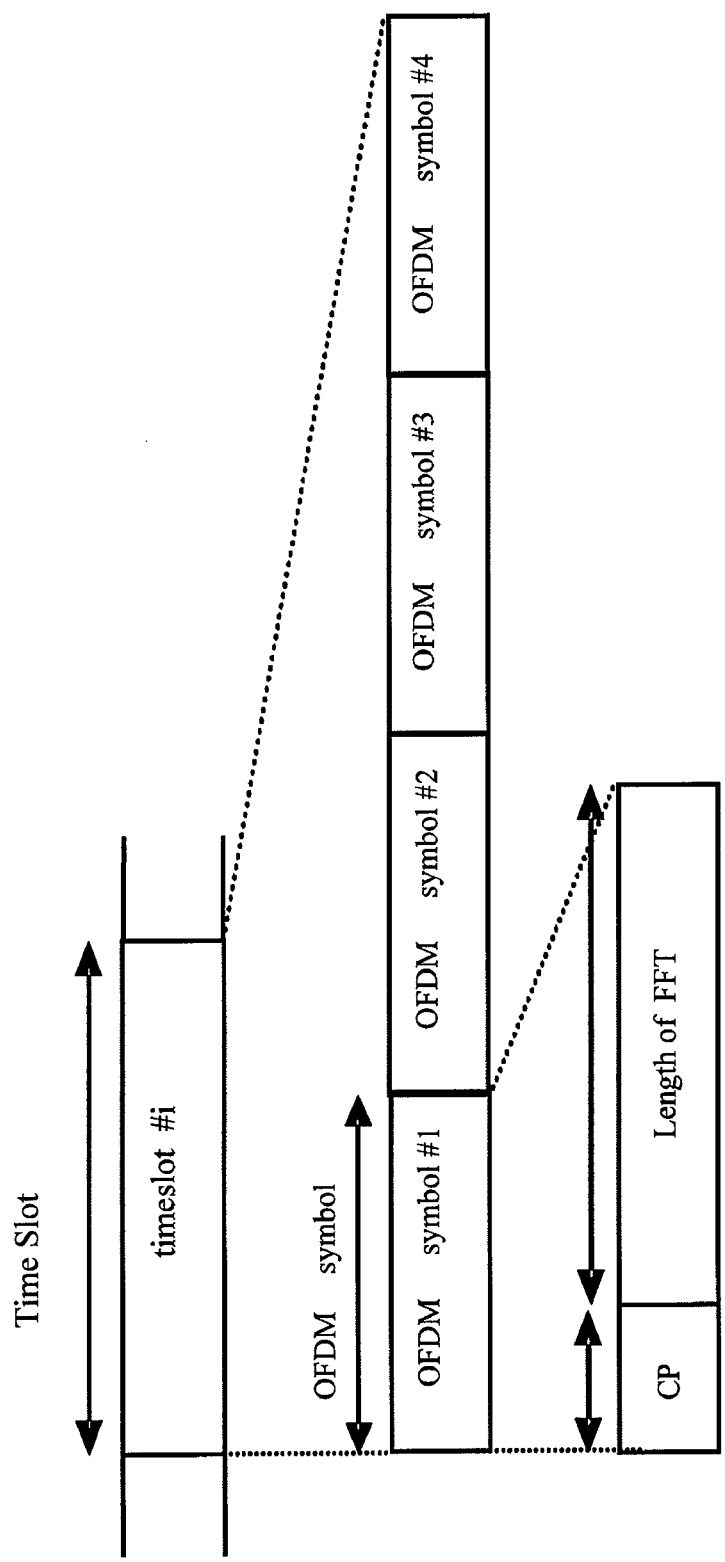
FIG. 6 illustrates a time-slot structure of an OFDMA system, where one time-slot is comprised of four OFDM symbols, and each OFDM symbol contains a cyclic prefix and a basic OFDM signal.

FIG. 6 illustrates a structure of a time-slot, where each time-slot consists of multiple OFDM symbols (4 in the example). In one embodiment, one OFDM symbol is used on the downlink in a subframe to indicate the downlink MCS for each used subchannel and the command for uplink MCS and power control. One OFDM symbol is used on the uplink in the subframe to indicate the measured downlink CQI for corresponding mobile stations. Different mobile stations fill different bit fields in the OFDM symbol, corresponding to their downlink subchannels respectively.

Figure 7:
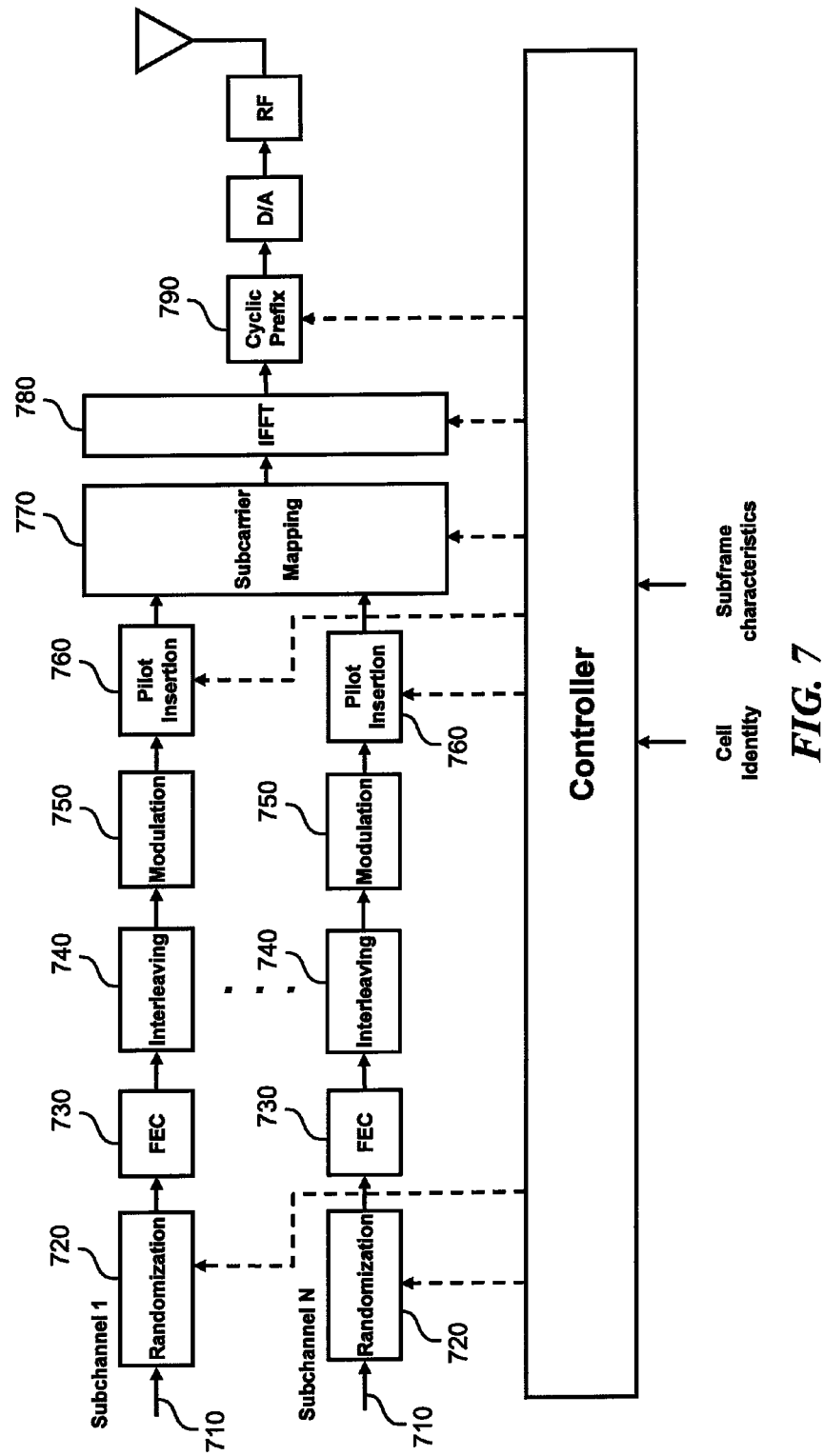
FIG. 7 illustrates a block diagram of an OFDMA system using adaptable frame structure (AFS).

FIG. 7 illustrates the functional block diagram of an OFDMA system using AFS. Input data 710 for a subchannel are first randomized in randomization element 720, encoded with forward error correcting codes (FEC) in FEC element 730, passed through an interleaver 740, and then modulated in modulation facility 750. The modulated symbols as well as pilot symbols, which are inserted in pilot insertion facility 760, are mapped to subcarriers by element 770 according to a subchannel-subcarrier configuration. An IFFT (Inverse Fast Fourier Transform) 780 converts the subcarriers from frequency domain to time domain, and then cyclic prefixes are added in cyclic prefix facility 790. A controller controls the randomization, the pilot configuration, subcarrier mapping, FFT size, and cyclic prefix length based on the cell identity and the subframe characteristics. For example, if the first subframe is used to provide voice services, the controller sets the randomization, the pilot configuration, subcarrier mapping, etc., which are different from those used in other cells. On the other hand, if the second subframe is used to provide broadcast services, the controller sets these parameters to be the same as others. Additionally, the modulation, coding, and the transmission power can also be adaptively controlled based on the channel status.

Two-way data communication may be carried out using a subframe called a third subframe while data (including video) broadcasting is carried out using another subframe called a fourth subframe. OFDM is used in both subframes. The system configuration, such as the randomizer, the subchannel construction, the FFT size, the length of cyclic prefix, and pilot configuration, for the third subframe can be different from those of the fourth subframe, corresponding to their different transmission characteristics.

In one embodiment, in the third subframe, the randomizer, the pilot configuration, or the subcarrier permutation within a subchannel are different in individual cells to achieve inter-cell interference randomization and to facilitate frequency reuse among multiple cells. For the fourth subframe, the randomizer, the pilot configuration, and the subcarrier permutation within a subchannel are the same in different cells. Therefore, for the fourth subframe, multiple base stations and cells form a single frequency network (SFN). This improves the broadcasting performance because the broadcast data are the same for all cells in the network. FIG. 7 also shows a controlling mechanism for different types of subframes.

In another embodiment, the entire fourth subframe is used for the downlink broadcasting or at least one uplink time-slot is used to facilitate a continuous flow of channel feedback information, potentially improving the communication efficiency in other subframes.

While specific circuitry may be employed to implement the above embodiments, aspects of the invention can be implemented in a suitable computing environment. Although not required, aspects of the invention may be implemented as computer-executable instructions, such as routines executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessorbased or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the processes explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The above detailed description of the embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways.

Also, while processes or blocks are at times shown as being performed in series, these processes or blocks may instead be performed in parallel, or may be performed at different times. Where the context permits, words in the above Detailed Description using the singular or plural number may also include the plural or singular number respectively.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method of signal generation and transmission for a base station in a multi-cell orthogonal frequency division multiple access (OFDMA) wireless system having a plurality of base stations in a plurality of cells, the method comprising:
   generating orthogonal frequency division multiplexing (OFDM) symbols in a plurality of subframes by:
      scrambling frequency-domain data before modulation;
      modulating the scrambled data to produce modulated data symbols;
      generating training symbols;
      mapping the modulated data symbols to frequency-domain data subcarriers and the training symbols to frequency-domain pilot subcarriers; and converting the frequency-domain data subcarriers and frequency-domain pilot subcarriers to time-domain signals;

controlling a configuration of the training symbols used to generate the OFDM symbols differently between subframes based on characteristics of each subframe, wherein:

in a first type of subframe, the configuration of the training symbols is different among individual cells in the wireless system and based on a cell identity of each cell to facilitate unicasting; and in a second type of subframe, the configuration of the training symbols is the same for multiple cells in the wireless system to facilitate broadcasting; and transmitting the plurality of OFDM symbols.

2. The method of claim 1, further comprising controlling a configuration for frequency-domain data scrambling used to generate OFDM symbols differently between subframes based on characteristics of each subframe, wherein:

in the first type of subframe, the configuration for frequency-domain data scrambling is different among individual cells in the wireless system and based on a cell identity of each cell to facilitate unicasting; and in the second type of subframe, the configuration for frequency-domain data scrambling is the same for multiple cells in the wireless system to facilitate broadcasting.

3. The method of claim 1, wherein the frequency-domain data subcarriers and frequency-domain pilot subcarriers are converted to time-domain signals using an inverse Fast Fourier Transform (FFT), and the size of the inverse FFT varies between subframes.

4. The method of claim 1, further comprising adding a cyclic prefix to a time domain signal to generate an OFDM symbol, wherein the length of the cyclic prefix varies between subframes.

5. The method of claim 1, wherein a subcarrier permutation used in the subcarrier mapping is based on a cell identity of a cell.

6. The method of claim 1, further comprising constructing a frequency-domain subchannel based on a cell identity of a cell.

7. The method of claim 1, wherein a single frequency network (SFN) is formed among the multiple cells during the data broadcasting.

8. The method of claim 1, wherein the configuration of the training symbols includes the phases, the amplitudes, or both, of the training symbols.

9. The method of claim 1, further comprising inserting a special downlink period (SDP) in a subframe for transmission of control information including a cell identity.

10. A method of signal transmission and reception for a mobile station in a multi-cell orthogonal frequency division multiple access (OFDMA) wireless system having a plurality of cells, each of the plurality of cells associated with a serving base station, the method comprising:

transmitting uplink signals to a serving base station, the uplink signals carrying control information, data packets, or both; and receiving downlink signals comprised of a plurality of orthogonal frequency division multiplexing (OFDM) symbols in a plurality of subframes from the serving base station, wherein the received OFDM symbols were generated at the serving base station by:

scrambling frequency-domain data before modulation;

modulating the scrambled data to produce modulated data symbols;

generating training symbols;

mapping the modulated data symbols to frequency-domain data subcarriers and the training symbols to frequency-domain pilot subcarriers; and converting the frequency-domain data subcarriers and frequency-domain pilot subcarriers to time-domain signals; and the received training symbols in the OFDM symbols were configured differently between subframes at the serving base station based on characteristics of each subframe, wherein:

in a first type of subframe, the configuration of the training symbols is different among individual cells in the wireless system and based on a cell identity of each cell to facilitate unicasting; and in a second type of subframe, the configuration of the training symbols is the same for multiple cells in the wireless system to facilitate broadcasting.

11. The method of claim 10, wherein the frequency-domain data scrambling used to generate OFDM symbols were configured differently between subframes at the serving base station based on characteristics of each subframe, wherein:

in the first type of subframe, the configuration for frequency-domain data scrambling is different among individual cells in the wireless system and based on a cell identity of each cell to facilitate unicasting; and in the second type of subframe, the configuration for frequency-domain data scrambling is the same for multiple cells in the wireless system to facilitate broadcasting.

12. The method of claim 10, further comprising converting each received OFDM symbol from the time domain to the frequency domain using a Fast Fourier Transform (FFT), wherein the size of the applied FFT varies between subframes.

13. The method of claim 10, wherein the received downlink signals have an OFDM cyclic-prefix (CP) length that varies between subframes.

14. The method of claim 10, wherein the configuration of the training symbols comprises the phases, the amplitudes, or both, of the training symbols.

15. The method of claim 10, wherein a subchannel in the received downlink signals was constructed based on the cell identity of the cell.

16. The method of claim 10, wherein the uplink signals further comprise a special uplink period (SUP) in a subframe, the SUP allowing the mobile station to carry out radio functions, including initial ranging during power up and hand-off, periodic ranging, bandwidth request, or channel sounding.

17. The method of claim 10, further comprising monitoring the quality of the received OFDM symbols and sending channel quality information (COI), power control request, or both to the serving base station in the uplink signals.

18. The method of claim 10, further comprising:

receiving a transmitted packet from the serving base station;

determining whether the transmitted packet was successfully received or unsuccessfully received; and sending an acknowledgement (ACK) to the serving base station if the packet was successfully received or a negative acknowledgement (NAK) to the serving base station if the packet was unsuccessfully received.

19. In a multi-cell orthogonal frequency division multiple access (OFDMA) wireless system having a plurality of base stations in a plurality of cells, a base station capable of generating and transmitting signals to one or more mobile stations in a cell, the base station comprising:

an apparatus configured for generating orthogonal frequency division multiplexing (OFDM) symbols in a plurality of subframes by:
scrambling frequency-domain data before modulation;
modulating the scrambled data to produce modulated data symbols;
generating training symbols;
mapping the modulated data symbols to frequency-domain data subcarriers and the training symbols to frequency-domain pilot subcarriers; and
converting the frequency-domain data subcarriers and frequency-domain pilot subcarriers to time-domain signals;
a controller for controlling a configuration of the training symbols used to generate the OFDM symbols differently between subframes based on characteristics of each subframe, wherein:
in a first type of subframe, the configuration of the training symbols is different among individual cells in the wireless system and based on a cell identity of each cell to facilitate unicasting; and
in a second type of subframe, the configuration of the training symbols is the same for multiple cells in the wireless system to facilitate broadcasting; and
a transmitter for transmitting the plurality of OFDM symbols.

20. The base station of claim 19, wherein the controller further controls a configuration for frequency-domain data scrambling used to generate OFDM symbols differently between subframes based on characteristics of each subframe, wherein:
in the first type of subframe, the configuration for frequency-domain data scrambling is different among individual cells in the wireless system and based on a cell identity of each cell to facilitate unicasting; and
in the second type of subframe, the configuration for frequency-domain data scrambling is the same for multiple cells in the wireless system to facilitate broadcasting.

21. The base station of claim 19, wherein the unicasting comprises data unicasting or voice communication.

22. The base station of claim 19, wherein the broadcasting comprises data broadcasting or video broadcasting.

23. The base station of claim 19, wherein the configuration of the training symbols comprises the phases, the amplitudes, or both, of the training symbols.

24. In a multi-cell orthogonal frequency division multiple access (OFDMA) wireless system having a plurality of cells, each of the plurality of cells associated with a serving base station, a mobile station capable of transmitting signals to and receiving signals from the serving base station, the mobile station comprising:

a transmitter configured for transmitting uplink signals to a serving base station, the uplink signals carrying control information, data packets, or both; and
a receiver configured for receiving downlink signals comprised of a plurality of orthogonal frequency division multiplexing (OFDM) symbols in a plurality of subframes from the serving base station, wherein the received OFDM symbols were generated at the serving base station by:
scrambling frequency-domain data before modulation;
modulating the scrambled data to produce modulated data symbols;
generating training symbols;
mapping the modulated data symbols to frequency-domain data subcarriers and the training symbols to frequency-domain pilot subcarriers; and
converting the frequency-domain data subcarriers and frequency-domain pilot subcarriers to time-domain signals; and
the received training symbols in the OFDM symbols were configured at the serving base station based on characteristics of each subframe, wherein:
in a first type of subframe, the configuration of the training symbols is different among individual cells in the wireless system and based on a cell identity of each cell to facilitate unicasting; and
in a second type of subframe, the configuration of the training symbols is the same for multiple cells in the wireless system to facilitate broadcasting.

25. The mobile station of claim 24, wherein the frequency-domain data scrambling used to generate OFDM symbols were configured at the serving base station based on characteristics of the each subframe, wherein:
in the first type of subframe, the configuration for frequency-domain data scrambling is different among individual cells in the wireless system and based on a cell identity of each cell to facilitate unicasting; and
in the second type of subframe, configuration for frequency-domain data scrambling is the same for multiple cells in the wireless system to facilitate broadcasting.

26. The mobile station of claim 24, wherein the unicasting comprises data unicasting or voice communication.

27. The mobile station of claim 24, wherein the broadcasting comprises data broadcasting or video broadcasting.

28. The mobile station of claim 24, wherein the configuration of the training symbols comprises the phases, the amplitudes, or both, of the training symbols.

* * * * *

UNITED STATES PATENT AND TRADEMARK OFFICE
CERTIFICATE OF CORRECTION

PATENT NO. : 8,724,443 B2  
APPLICATION NO. : 13/226434  
DATED : May 13, 2014  
INVENTOR(S) : Li et al.

Page 1 of 1

It is certified that error appears in the above-identified patent and that said Letters Patent is hereby corrected as shown below:

In the Claims

Column 10, line 52, claim 17, delete "(COI)," and insert -- (CQI), --, therefor.

Signed and Sealed this  
Fifth Day of August, 2014

Michelle K. Lee  
*Deputy Director of the United States Patent and Trademark Office*